United States Patent
Sinha et al.

(10) Patent No.: US 11,646,991 B2
(45) Date of Patent: May 9, 2023

(54) SYSTEM AND METHOD FOR OPTIMIZING ARP BROADCAST

(71) Applicant: Hewlett Packard Enterprise Development LP, Houston, TX (US)

(72) Inventors: Ankit Kumar Sinha, Bangalore (IN); Saumya Dikshit, Bangalore (IN); Vinayak Joshi, Bangalore (IN); Venkatesh Natarajan, Bengaluru (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 169 days.

(21) Appl. No.: 17/334,005

(22) Filed: May 28, 2021

(65) Prior Publication Data

US 2022/0385620 A1    Dec. 1, 2022

(51) Int. Cl.
*H04L 61/103* (2022.01)
*H04L 45/02* (2022.01)
*H04L 61/255* (2022.01)
*H04L 12/46* (2006.01)
*H04L 12/66* (2006.01)
*H04L 61/58* (2022.01)
*H04L 61/59* (2022.01)

(52) U.S. Cl.
CPC ........ *H04L 61/103* (2013.01); *H04L 12/4641* (2013.01); *H04L 12/66* (2013.01); *H04L 45/04* (2013.01); *H04L 61/255* (2013.01); *H04L 61/58* (2022.05); *H04L 61/59* (2022.05)

(58) Field of Classification Search
None
See application file for complete search history.

(56) References Cited

U.S. PATENT DOCUMENTS

| | | | |
|---|---|---|---|
| 2017/0019370 A1* | 1/2017 | Ravinoothala | H04L 47/806 |
| 2020/0177508 A1* | 6/2020 | Kumar | H04L 47/125 |
| 2021/0226912 A1* | 7/2021 | Ranpise | H04L 12/4633 |

OTHER PUBLICATIONS

Cisco, "BGP EVPN VXLANConfiguration Guide, Cisco IOS XE Amsterdam 17.3.x (Catalyst 9300 Switches)", Jul. 31, 2020, 540 pages.
Cisco, "Cisco Nexus 9000 Series NX-OS VXLAN Configuration Guide, Release 7.x", Jan. 27, 2015, 270 pages.
E. Rosen, "IANA Registries for BGP Extended Communities", Internet Engineering Task Force (IETF), Request for Comments: 7153, Mar. 2014, 16 pages.
Kelly, Russell, "Centralized vs. Distributed VxLAN Routing with EVPN", May 16, 2019, 5 pages.
Sangli et al., "BGP Extended Communities Attribute", Network Working Group, Feb. 2006, 12 pages.

* cited by examiner

*Primary Examiner* — Angela Nguyen
(74) *Attorney, Agent, or Firm* — Park, Vaughan, Fleming & Dowler LLP

(57) ABSTRACT

One aspect provides a method and system for managing address resolution requests in a network. During operation, a gateway of the network advertises a route for sending address resolution requests and determines whether a cached entry corresponding to an address resolution request received via the route exists in a neighbor table. In response to determining that the cached entry exists, the gateway responds to the address resolution request based on the cached entry; in response to determining that the cached entry does not exist, the gateway replicates the address resolution request to edge devices in the network, thereby facilitating discovery of a target host corresponding to the address resolution request.

20 Claims, 8 Drawing Sheets

SYSTEM AND METHOD FOR OPTIMIZING ARP BROADCAST

BACKGROUND

Field

This disclosure is generally related to managing address resolution requests in a centralized network. More specifically, this disclosure is related to a system and method for reducing the flooding of the address resolution requests in the centralized network.

BRIEF DESCRIPTION OF THE FIGURES

In the figures, like reference numerals refer to the same figure elements.

DETAILED DESCRIPTION

Figure 1A:
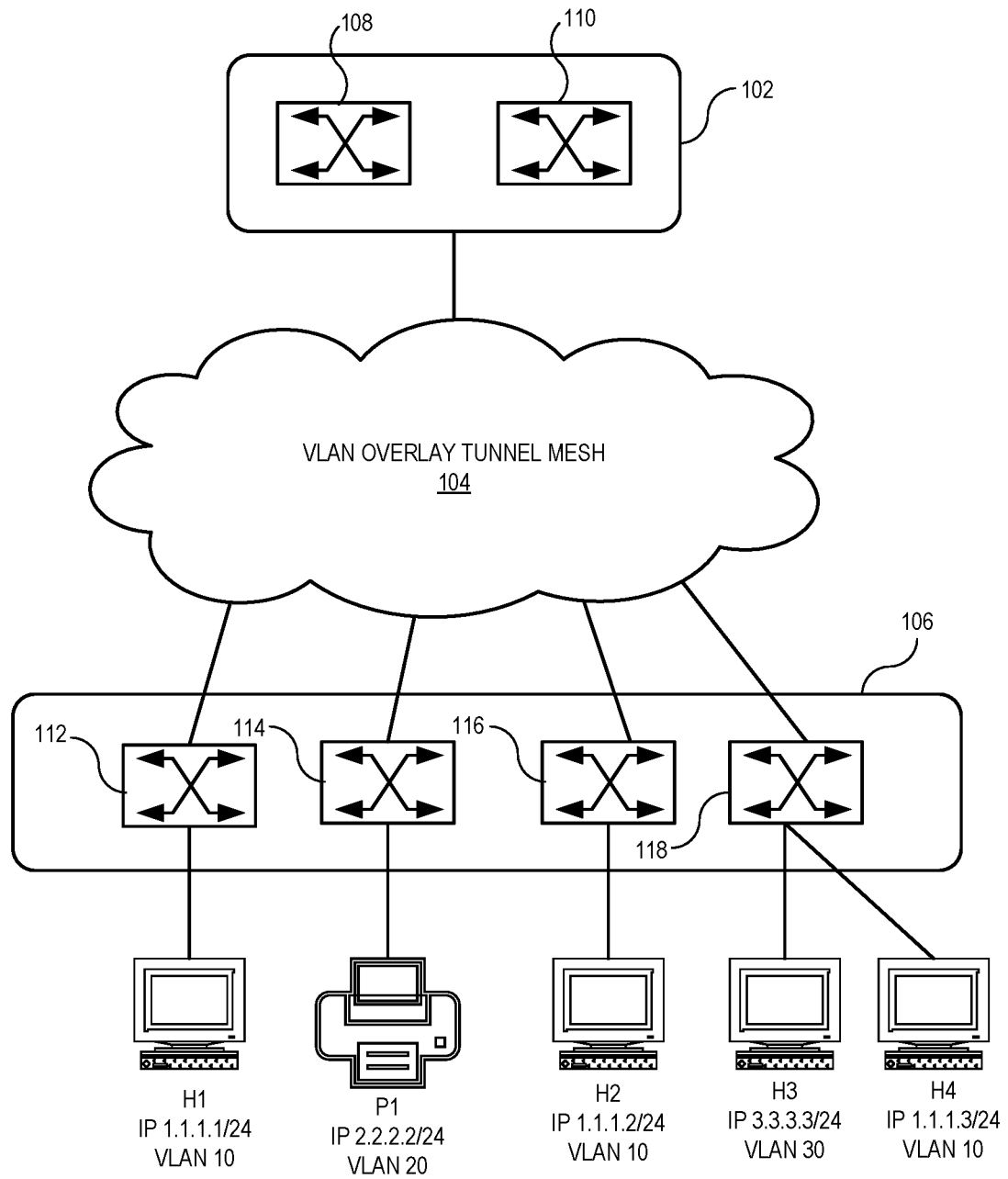
FIG. 1A illustrates an exemplary campus network implementing centralized routing.

The following description is presented to enable any person skilled in the art to make and use the aspects of this application and is provided in the context of a particular application and its requirements. Various modifications to the disclosed aspects of this application will be readily apparent to those skilled in the art, and the general principles defined herein may be applied to other aspects and applications without departing from the spirit and scope of the present disclosure. Thus, the scope of the present disclosure is not limited to the examples shown but is to be accorded the widest scope consistent with the principles and features disclosed herein.

Virtual Extensible Local Area Network (VxLAN) technology addresses the scalability problems associated with large cloud computing deployment and is now widely deployed in data center networks and campus switching networks. Ethernet Virtual Private Network (EVPN) provides a scalable, interoperable end-to-end control-plane solution for VxLAN using Border Gateway Protocol (BGP). EVPN defines a way for a Virtual Tunnel Endpoint (VTEP) to discover other VTEPs in the network and the connected hosts in the underlay network.

The two main deployment architectures in VxLAN are centralized and distributed. In the centralized architecture, all but a few of the VTEPs behave as layer-2 (L2) VTEPs and do not act as a gateway for the overlay hosts. All routings between the L2 segments happen on a centralized VTEP. The typical characteristic of this architecture is that the inter L2 segment traffic trombones via the centralized gateways. In the distributed architecture, each VTEP acts as the default gateway for the overlay hosts connected to the VxLAN subnets. In a large network (either EVPN-based or conventional networks) having a large number of neighbors, address resolution or neighbor discovery requests (e.g., address resolution protocol (ARP) requests or neighbor solicitations in Neighbor Discovery Protocol (NDP)) flooding the network can consume a large amount of bandwidth. Note that the address resolution protocol (ARP) is used to map an IP version 4 (IPv4) address to the physical or media access control (MAC) address of a host, whereas the neighbor discovery protocol (NDP) is used to map an IP version 6 (IPv6) address to the physical or MAC address of a host.

ARP or ND suppression is a commonly used technique to reduce the amount of ARP broadcast in EVPN-VxLAN networks that follow the distributed routing model (e.g., data center networks). However, ARP or ND suppression is not readily available in EVPN-VxLAN networks that follow the centralized routing model (e.g., campus switching networks). This is because ARP/ND suppression is a router function and, unlike the distributed routing model that mandates routing functionality in edge switches, the centralized routing model typically deploys low-cost L2 switches (or switches that have high throughput but are not feature rich) at the edge. Such low-cost L2 switches lack the capability, in terms of hardware and software, to perform ARP/ND functions.

In conventional VxLAN overlay networks, a BGP-EVPN control plane is used to provision VxLAN. Overlay tunnels are used for VxLAN overlay fabric set up over the control plane. Once the overlay fabric is set up, broadcast, unknown-unicast, and multicast (BUM) traffic will be replicated to all remote VTEPs. In the centralized routing deployment, layer-3 (L3) traffic is routed by one of the L3-enabled centralized gateway router VTEPs, but the BUM traffic is still replicated to all VTEPs, including edge L2 VTEPs. This means that ARP broadcast requests or the multicast neighbor solicitations will be replicated to all VTEPs, consuming large amounts of network bandwidth.

FIG. 1A illustrates an exemplary campus network implementing centralized routing. Campus network 100 can include campus core cluster 102, a VxLAN overlay tunnel mesh 104, and an access (L2) layer 106. Campus core cluster 102 can include multiple core routers (e.g., core routers 108 and 110) to provide high availability and load balancing, and access layer 106 includes a number of access switches (e.g., switches 112-118), with each VTEP supporting one or more VLANs.

As shown in FIG. 1A, the default gateway for a number of subnets (e.g., subnets 1.1.1.0/24, 2.2.2.0/24, and 3.3.3.0/24) are core routers 108 and 110. Therefore, ARP/ND traffic requesting the MAC of the default gateway, which is originated by end hosts connected to the access switches (e.g., H1 connected to switch 112), has to reach core cluster 102 over VxLAN overlay tunnel mesh 104 to solicit a response. In one example, IP unicast from host H1 to host H3 (which are located in different subnets) first traverses access switch 112 and a VxLAN tunnel to campus core cluster 102; then, it is decapsulated and forwarded in L3, before it is sent over a VxLAN tunnel to access switch 118. All inter-subnet traffic is routed by core cluster 102, hence the term "centralized routing."

On the other hand, intra-subnet unicast and BUM traffic (e.g., unicast traffic from host H1 to host H2, ARP requests originating from host H4, etc.) are switched by the L2 access switches over a single hop VxLAN transport tunnel.

Figure 1B:
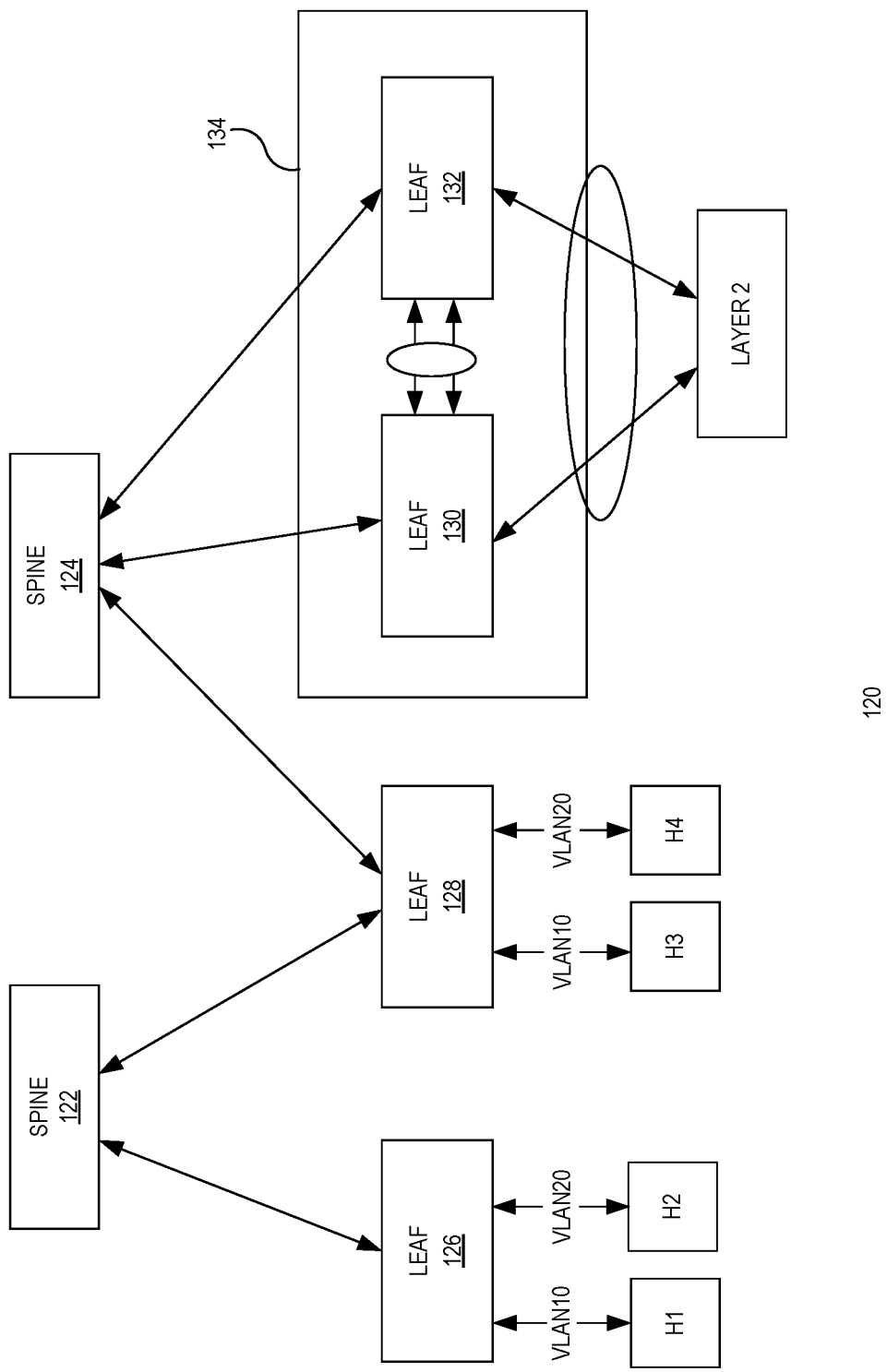
FIG. 1B illustrates an exemplary data center network implementing centralized routing.

FIG. 1B illustrates an exemplary data center network implementing centralized routing. Data center network 120 can include a number of spine nodes (e.g., nodes 122 and 124) and a number of leaf nodes (e.g., nodes 126-132). More specifically, leaf nodes 126 and 128 are low-cost L2 switches, whereas leaf nodes 130 and 132 are L3 routers (e.g., top-of-rack (ToR) routers) that form a centralized gateway cluster 134. L3 routers 130 and 132 are responsible for routing traffic and, hence, have all networks (i.e., all VLANs) configured. In the example shown in FIG. 1B, any communication between host H1 (which belongs to VLAN 10) and host H2 (which belongs to VLAN 20) will happen via centralized gateway cluster 134.

To provide high availability, different redundancy mechanisms can be used to implement the centralized gateway (e.g., campus core cluster 102 in FIG. 1A or centralized gateway cluster 134 in FIG. 1B). For example, the centralized gateway can be a cluster of multiple routers as shown in FIGS. 1A-1B. Members of the cluster (e.g., core routers 108 and 110) can be all active, or some members can be active while others are in a standby mode. It is also possible to achieve clustering of routers using propriety solutions developed by different vendors or using the standard EVPN multihoming technology. In the examples shown in FIGS. 1A and 1B, there is only one centralized gateway cluster. In practice, it is also possible to have multiple centralized gateway clusters in the network to provide a higher level of redundancy. Alternatively, instead of the cluster solution, one can also implement multiple independent (not clustered) routers acting as centralized gateways. Various load-balancing mechanisms (e.g., round robin, random selection, etc.) can be used to load balance among the multiple routers in a centralized gateway cluster, or multiple clusters, or multiple independent centralized gateway routers. The scope of this disclosure is not limited by the actual implementations of the centralized gateway(s) and the load-balancing techniques.

As discussed previously, when a centralized routing model is implemented (e.g., as shown in FIGS. 1A and 1B), the non-gateway switches are low-cost L2 switches lacking the ARP/ND suppression capabilities. For example, in FIG. 1B, ARP suppression will not take place on leaf switches 126 or 128. Consequently, when host H1 (attached to switch 126) generates an ARP broadcast request (e.g., for host H4 attached to switch 128), it will be replicated to all leaf devices (including leaf devices 128-132) and eventually reaches the target host (e.g., host H4). The target host can then reply to the request, and the reply is forwarded to the requesting host H1. Note that, when the ARP request is replicated to all leaf devices, leaf switches 126 and 128 cannot perform ARP suppression, whereas centralized gateway routers 130 and 132, although capable, have no reason to suppress the ARP request as it would have already reached the target host. The same will happen for multicast neighbor solicitation (NS) used in Internet Protocol Version 6 (IPV6). For a large network with a large number of nodes (i.e., VTEPs), with a large number of hosts attached to each node, the ARP broadcast or NS multicast packets will consume huge amounts of bandwidth.

One solution to accomplish ARP/ND suppression is to build ARP/ND cache per VLAN on the L2 switches, which can be done via "snooping/glean" at the L2 switches. However, considering that there are many switches in the network, building an ARP/ND cache per VLAN can be costly. Moreover, in the centralized network (data center network or campus network), the edge devices are lower-end cost-effective L2 switches, whereas ARP/ND cache maintenance demands higher requirements on CPU and memory, making this solution impractical.

The main cause of APR flooding is the ingress VTEP replicating the ARP request to all VTEPs. To reduce the amount of ARP flooding, in some aspects of this application, when receiving an ARP request, the ingress VTEP can be configured in such a way that it only forwards such request to the centralized gateway, without replicating the request to other peer L2 VTEPs. Note that this approach does not require any non-standard data-plane behavior. During operation, the flood domain in the L2 VTEP for the ARP request is confined by its control plane to just tunnel toward the centralized gateway.

As discussed before, the centralized gateway is responsible for performing routing and has the capability of ARP/ND suppression. Therefore, forwarding the ARP/ND request to the centralized gateway allows the centralized gateway to perform ARP/ND suppression on behalf of the ingress VTEP, if the centralized gateway already has in its cache an ARP entry for the target IP. On the other hand, if the centralized gateway does not have the corresponding ARP entry in its cache, it can either flood the ARP in the subnet (i.e., over the VxLAN fabric or resolve the ARP request by using its own address as the source IP and then suppressing the original ARP request.

Figure 2:
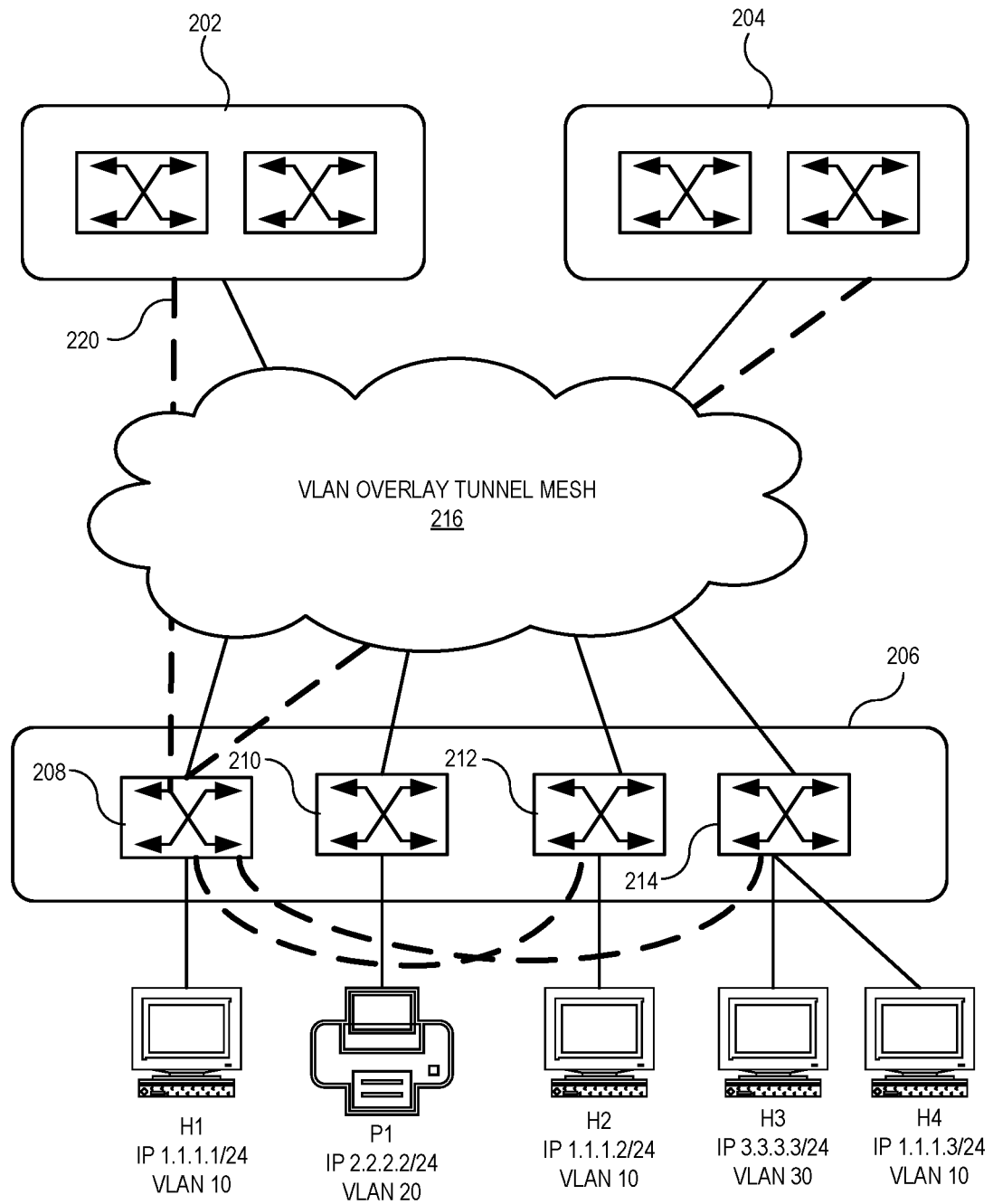
FIG. 2 illustrates an exemplary deployment scenario for ARP/ND suppression in a centralized network, according to one aspect of this application.

FIG. 2 illustrates an exemplary deployment scenario for ARP/ND suppression in a centralized network, according to one aspect of this application. Such a deployment scenario is common to both the data center network and the campus network. In FIG. 2, network 200 includes multiple border clusters (e.g., border clusters 202 and 204), with each border cluster including multiple L3 routers. Note that a border cluster can be the campus core cluster in the campus network or a centralized gateway cluster in the data center network. Network 200 also includes an L2 edge layer 206 that includes a number of edge devices (e.g., L2 switches 208-214). Each edge switch can support one or more VLANs. The edge devices can be the L2 access switches in the campus network or the L2 leaf switches in the data center network. Network 200 also includes a VxLAN overlay tunnel mesh 216 that couples the border clusters and the edge switches.

In the example shown in FIG. 2, there are two border clusters. In practice, it is possible to implement just one border cluster or more than two clusters. Similarly, in addition to the two-routers-per-cluster implementation shown in FIG. 2, it is also possible to have more routers in a cluster or have multiple independent routers.

Using FIG. 2 as an example, supposing that all border routers in clusters 202 and 204 can act as the centralized router for VLAN 10 and that VLAN 10 is mapped to a particular VxLAN virtual network identifier (VNI), these border routers in clusters 202 and 204 and edge switches 208-214 will consequently send out an EVPN route type-3 (RT3) route, announcing the presence of VLAN 10's footprint on them. In this example, the announced route contains the particular VNI, which represents VLAN 10.

In a conventional network, upon receiving the routes, the switches and routers can create the VxLAN tunnel broadcast domain for the corresponding VLAN (e.g., VLAN 10 in the current example). For example, edge switch 208 can add the following VxLAN tunnels to the broadcast domain of VLAN 10: tunnel(s) from edge switch 208 to border cluster 202, tunnel(s) from edge switch 208 to border cluster 204, a tunnel from edge switch 208 to edge switch 212, and a tunnel from edge switch 208 to edge switch 214. These tunnels are shown in FIG. 2 as the dashed lines. Note that multiple tunnels can be set up between an edge switch and a cluster of routers. For a large-scale network comprising hundreds of edge switches or more, the broadcast domain can be very large and ARP/ND flooding can consume lots of bandwidth.

In some aspects of this application, to reduce the size of the broadcast domain, the centralized routers (e.g., the border routers in border clusters 202 and 204) can mark the RT-3 routes sent by them, advertising that they are capable of centralized routing, whereas the edge switches (e.g., switches 208-214) send out RT-3 routes as normal. Other than allowing the centralized routers to advertise, via the RT-3 routes, that they can perform centralized routing (hence, are capable of ARP/ND suppression), there is no other change made to the EVPN routing. In one aspect of this application, marking a RT-3 route as a route to a centralized router can be done using the Non-Transitive Opaque Extended Communities, which are part of the BGP Extended Communities (EC) attribute. The EC attribute provides a mechanism for labeling information carried in BGP. The BGP EC attribute consists of a sequence of eight-octet extended communities, with the first octet defined as the "type" field. Each Type has a range of values for Transitive Extended Community types and a range of values for Non-transitive Extended Community types. For some EC types, the second octet of the EC attribute is a "sub-type" file, and the remaining six octets are the "value" field.

Figure 3:
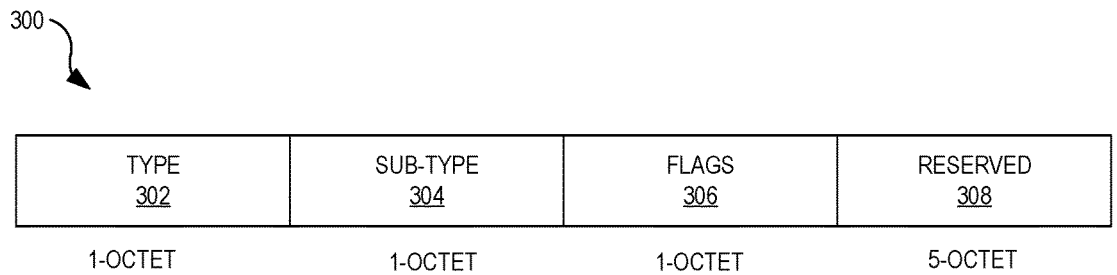
FIG. 3 illustrates an exemplary implementation of using Border Gateway Protocol (BGP)'s Extended Communities attribute to mark a route, according to one aspect of this application.

FIG. 3 illustrates an exemplary implementation of using BGP's Extended Communities attribute to mark a route, according to one aspect of this application. In FIG. 3, BGP EC attribute 300 includes a type field 302, a sub-type field 304, a flags field 306, and a reserved field 308.

Type field 302 can include one octet. In one aspect of this application, type field 302 can have a value of 0x43, indicating that the type of the community is Non-Transitive Opaque Extended Community. Sub-type field 304 can also include one octet and can have a value of 0x01, which is vendor-defined, indicating that the community is an IP Neighbor Extended Community. Flags field 306 can include one octet and can be set to 0. Reserved field 308 can include five octets and can also be set to 0.

The BGP EC attribute (e.g., attribute 300) can be sent by a centralized router along with the RT-3 route to edge devices, announcing to the edge devices that the centralized router can act as a replicator for the edge devices. Note that when a particular centralized router fails, the RT-3 route will be withdrawn for that particular centralized router after BGP timeout, which will in turn withdraw the above BGP EC attribute, thus preventing the edge device from sending the BUM traffic to the failed router.

Upon receiving all RT-3 routes (with some RT-3 routes being marked using BGP EC attribute 300) of a particular VLAN, an edge switch can add only those tunnels corresponding to the marked routes into its broadcast domain for the particular VLAN. In the example shown in FIG. 2, upon receiving all RT-3 routes for VLAN 10, edge switch 208 can add a single VxLAN tunnel (i.e., a tunnel 220 to border cluster 202) to its broadcast domain for VLAN 10. Because both border clusters 202 and 204 can perform replication, only one of them can be chosen for ARP/ND suppression, and the other one can be used as a backup. Similarly, because border cluster 202 includes multiple (e.g., two) routers, only one router can be chosen, whereas other routers can be used as backups.

Continuing with the example of edge switch 208, when it receives a broadcast ARP/ND request from host H1 for the IP address of host H4, edge switch 208 sends the ARP request to its broadcast domain for VLAN 10, which in this case includes only one tunnel to border cluster 202 (i.e., tunnel 220). Hence, edge switch 208 sends the ARP request to border cluster 202 over tunnel 220. Depending on the configuration of tunnel 220, the ARP/ND request can arrive at one of the border routers in border cluster 202. Upon receiving the ARP/ND request, the border router check its ARP/ND table to see if an ARP/ND entry corresponding to host H4's IP address is available. If so, the border router responds to the ARP/ND request and suppresses replication of the ARP/ND request. If not, the border router can either perform proxy ARP/ND or broadcast the request to end points hosting VLAN 10 (e.g., border cluster 204 and edge switches 212 and 214) over the VxLAN. Detailed descriptions of the operation of the border router will come later.

In some aspects of this application, all broadcasts (not just the ARP/ND broadcast) can share the same broadcast domain. Since there is only one VxLAN tunnel of the broadcast domain of VLAN 10 on edge switch 208, in addition to the ARP/ND broadcast, other broadcasts can also be directed to border cluster 202 via tunnel 220, and a border router in border cluster 220 can flood them in VLAN 10. Alternatively, an edge switch may maintain different broadcast domains for different types of broadcast. For example, the ARP/ND broadcast domain can be limited to the tunnel to a centralized router advertising itself as the ARP/NP resolver for the edge switch, whereas the broadcast domain for other types of broadcast can include all VTEPs hosting the particular VLAN.

Figure 4:
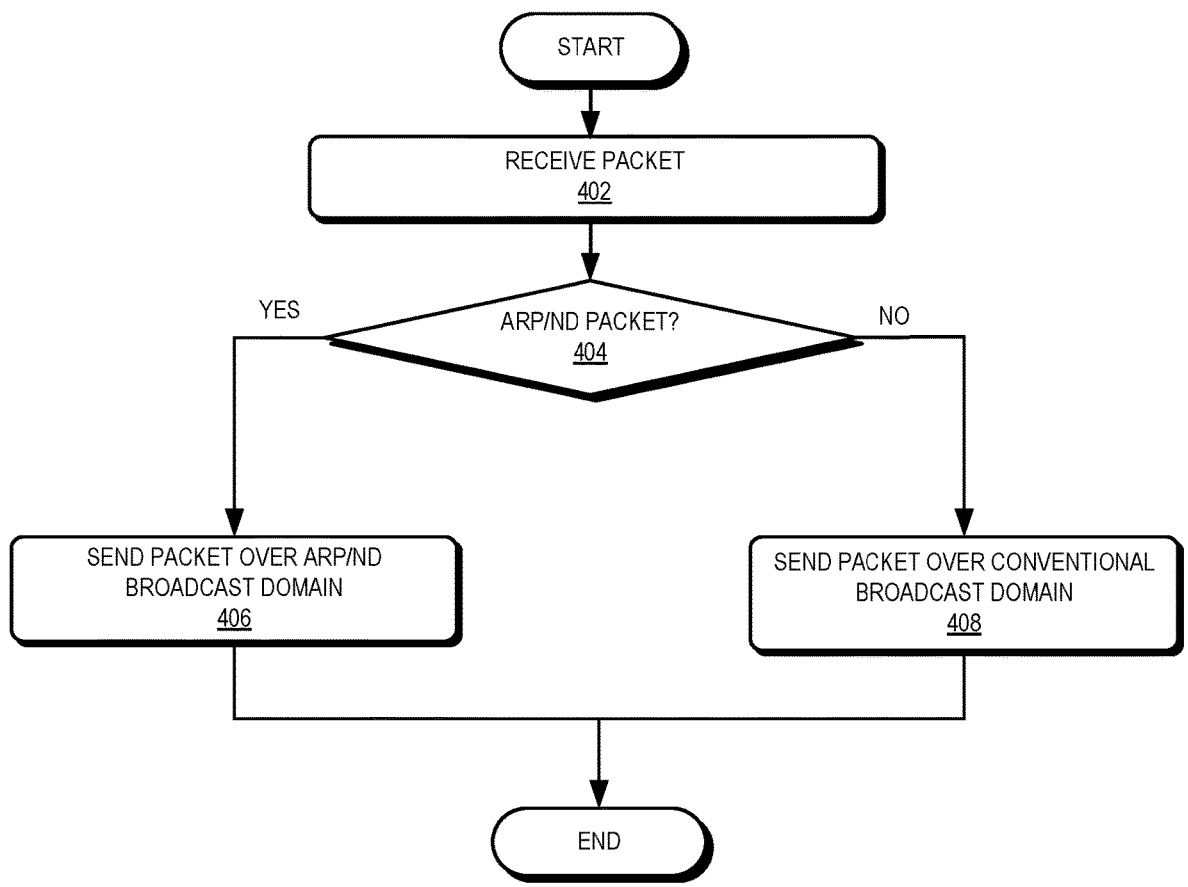
FIG. 4 presents a flowchart illustrating an exemplary process for forwarding a broadcast packet, according to one aspect of this application.

FIG. 4 presents a flowchart illustrating an exemplary process for forwarding a broadcast packet, according to one aspect of this application. During operation, an edge switch receives a broadcast packet (e.g., an ARP request) from a host in a particular VLAN (operation 402). The packet-processing logic on the switch determines if the packet is an ARP/ND packet (operation 404). This can be done by checking the packet header (e.g., the EtherType field) and can be performed by many low-cost L2 edge switches. If the packet is an ARP/ND packet, the edge switch can send the packet over an ARP/ND broadcast domain for the particular VLAN (operation 406). As discussed previously, such an ARP/ND broadcast domain can be much smaller than a conventional broadcast domain for the VLAN. In one aspect of this application, the ARP/ND broadcast domain can include a single tunnel to an L3 router advertising itself as the ARP resolver for the edge switch. Otherwise, the packet can be sent over the conventional broadcast domain that includes all VTEPs hosting the particular VLAN (operation 408). Note that, in this case, the centralized router will only re-broadcast the ARP/ND packet as needed and will not re-broadcast other types of broadcast packets, as they have been broadcast on the network by their original sender.

When the currently active router in the border cluster acting as an ARP/ND replicator/resolver (e.g., border cluster 202 in FIG. 2) fails, the failover mechanism within the border cluster handles the switch-over between the routers. This is a standard operation that does not involve the edge switches. If the entire border cluster (e.g., cluster 202 in FIG.

2) fails, the edge switch will be notified, via the traditional BGP-EVPN semantics. For example, in FIG. 2, the broadcast domain for VLAN 10 on edge switch 208 includes a single tunnel 220 to border cluster 202. When both routers in border cluster 202 fail, edge switch 208 will be notified of the tunnel failure. In response, edge switch 208 can add a tunnel to remaining border cluster 204 to the broadcast domain for VLAN 10 and remove the tunnel to cluster 202 from the broadcast domain. More specifically, edge switch 208 can look up the RT-3 routes that are marked as being sent by a centralized router and add a corresponding tunnel to the broadcast domain. When all border clusters fail, the edge switch can revert to the conventional approach by adding tunnels to other edge devices to its broadcast domain. For example, when border clusters 202 and 204 both fail, edge switch 208 looks up the RT-3 routes and determines that no marked RT-3 route for VLAN 10 is currently available. Accordingly, edge switch 208 can add tunnels to other edge switches hosting VLAN 10 to its broadcast domain (e.g., tunnels to edge switches 212 and 214). Note that when both border clusters 202 and 204 fail, hosts attached to the edge switches will not be able to communicate to the world outside of network 200. However, these hosts can still communicate among themselves, including broadcasting ARP/ND requests and receiving responses to the ARP/ND requests.

Figure 5:
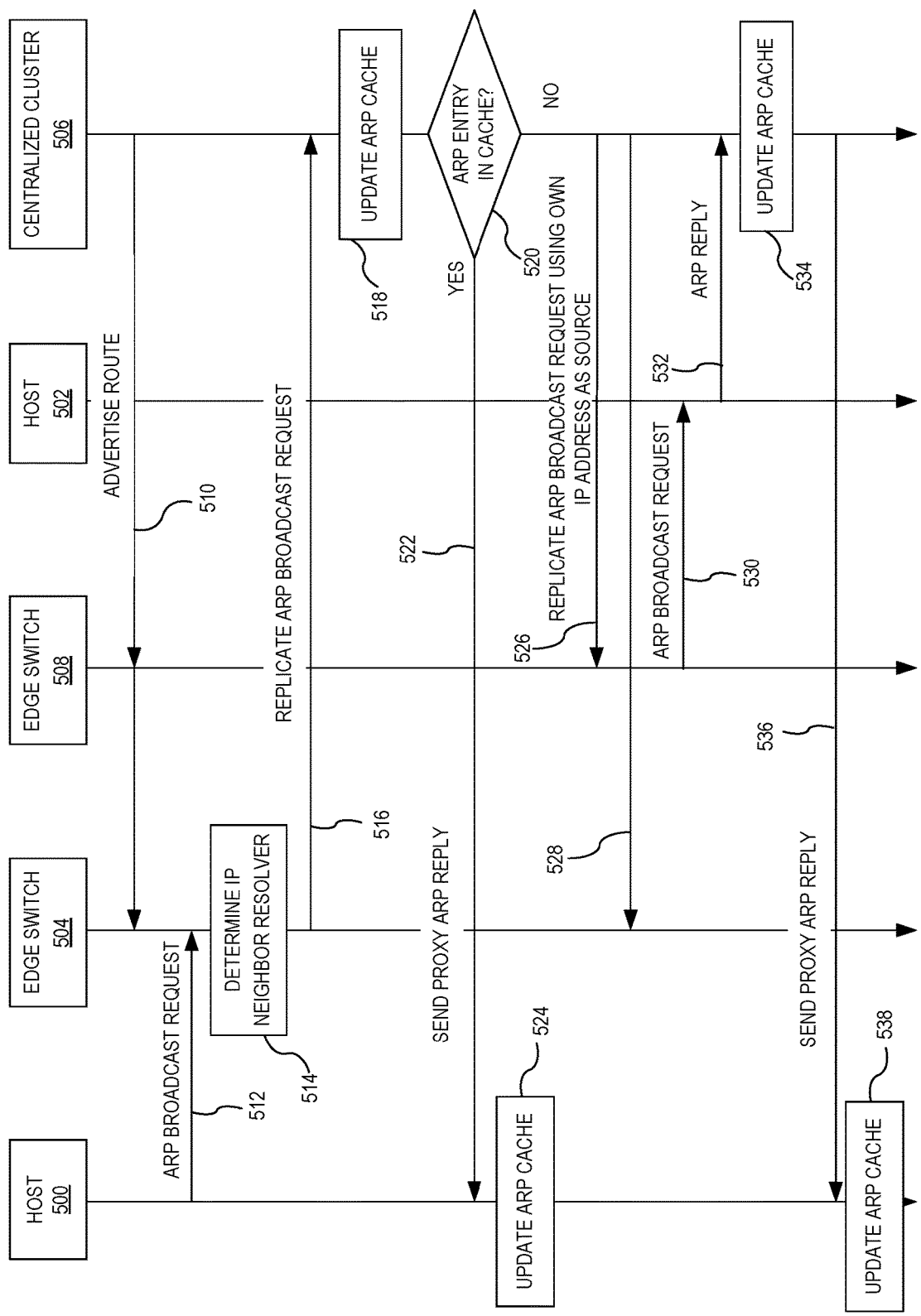
FIG. 5 illustrates a time-space diagram of an exemplary process for ARP replication and suppression in a centralized network, according to one aspect of this application.

FIG. 5 illustrates a time-space diagram of an exemplary process for ARP replication and suppression in a centralized network, according to one aspect of this application. The centralized network is similar to network 200 shown in FIG. 2 and comprises hosts 500 and 502, edge switches 504 and 508, and a centralized cluster 506. During operation, the centralized gateway (e.g., centralized cluster 506) advertises routes (e.g., RT-3 routes) for sending ARP requests to edge devices (e.g., edge switches 504 and 508) in the centralized network (operation 510). Host 500 (which corresponds to host H1 in FIG. 2) sends an ARP broadcast for target host 502 (which corresponds to host H4 in FIG. 2) to its attached edge switch 504 (which corresponds to edge switch 208 in FIG. 2) (operation 512). Edge switch 504 lacks the capability to resolve the ARP request, because it is an L2 switch. Instead, edge switch 504 determines that a centralized cluster 506 (which corresponds to border cluster 202 or 204 in FIG. 2) is its IP neighbor resolver for the particular VNI specified by the ARP request (operation 514) and replicates the ARP request to centralized cluster 506 (operation 516). Note that, if there are multiple IP neighbor resolvers, edge switch 504 can select one to replicate the ARP request or replicate the ARP request to all IP neighbor resolvers.

The active router(s) in centralized cluster 506 learns or updates its ARP cache (e.g., the ARP table) based on the source IP and MAC addresses included in the ARP request (operation 518). For example, it can add an ARP entry corresponding to host 500 based on the received ARP request.

Subsequently, centralized cluster 506 checks its ARP cache to determine if a corresponding ARP entry (i.e., an ARP entry corresponding to host H4) exists in the cache (operation 520). If so, centralized cluster 506 sends a proxy ARP reply to host 500 on behalf of target host 502 with the MAC address of target host 502 (operation 522), and host 500 subsequently updates its own ARP cache based on the reply (operation 524).

If not, centralized cluster 506, which acts as IP neighbor resolver for edge switch 504, can replicate the ARP broadcast request to all other edge switches in the network using its own IP address as the source IP address. In this example, centralized cluster 506 sends the modified ARP broadcast request to an edge switch 508 (which corresponds to edge switch 214 in FIG. 2) hosting the particular VLAN (e.g., VLAN 10) specified by the ARP request (operation 526) and source edge switch 504 (operation 528). Edge switch 508 sends the ARP broadcast request to target host 502, which is attached to edge switch 508 (operation 530). In response, target host 502 sends an ARP reply with its MAC address to centralized cluster 506 (operation 532). This is because the source address of the modified ARP request is the address of centralized cluster 506.

Centralized cluster 506 updates its ARP cache based on the reply (e.g., adding an entry for host H4) (operation 534) and sends a proxy ARP reply with the MAC address of target host 502 to host 500 (operation 536). Upon receiving the reply, host 500 updates its ARP cache (operation 538).

In the example shown in FIG. 5, centralized cluster 506 resolves the ARP request from edge switch 504 on its behalf by broadcasting the ARP requests to all edge switches on the particular network (e.g., VLAN 10). Although this can take a longer time to resolve the ARP request (as centralized cluster 506 has to forward the reply), centralized cluster 506 learns the address of target host 502 during this process, thus allowing centralized cluster 506 to suppress subsequent ARP requests for target host 502.

Figure 6:
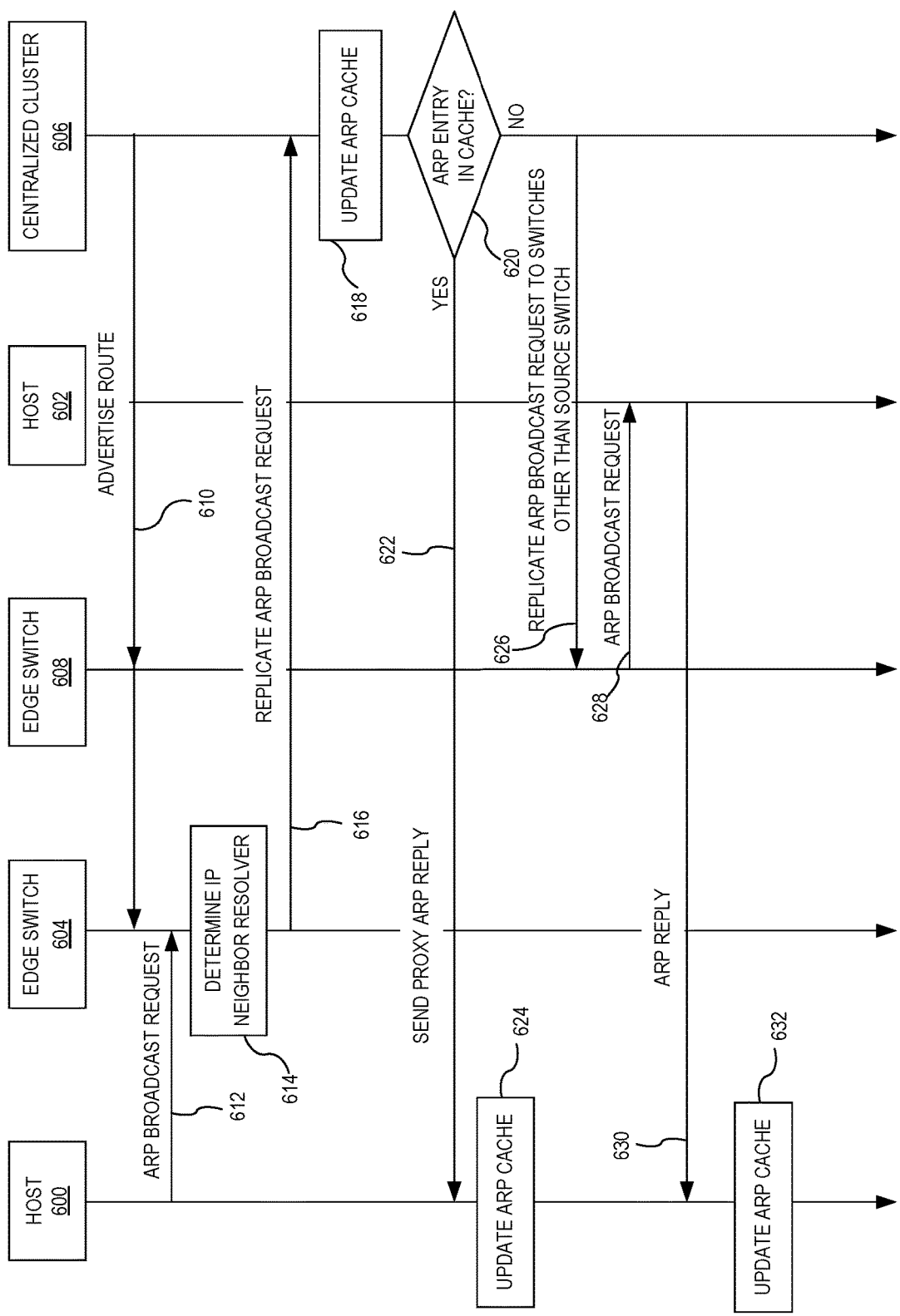
FIG. 6 illustrates a time-space diagram of an alternative process for ARP replication and suppression in a centralized network, according to one aspect of this application.

In an alternative aspect of this application, the centralized cluster or router may be configured differently. FIG. 6 illustrates a time-space diagram of an alternative process for ARP replication and suppression in a centralized network, according to one aspect of this application. The centralized network is similar to network 200 shown in FIG. 2 and comprises hosts 600 and 602, edge switches 604 and 608, and a centralized cluster 606. During operation, the centralized gateway (e.g., centralized cluster 606) advertises routes (e.g., RT-3 routes) for sending ARP requests to edge devices (e.g., edge switches 604 and 608) in the centralized network (operation 610). Host 600 (which corresponds to host H1 in FIG. 2) sends an ARP broadcast for a target host 602 (which corresponds to host H4 in FIG. 2) to its attached edge switch 604 (which corresponds to edge switch 208 in FIG. 2) (operation 612). Edge switch 604 lacks the capability to resolve the ARP request, because it is an L2 switch. Instead, edge switch 604 determines that a centralized cluster 606 (which corresponds to border cluster 202 or 204 in FIG. 2) is its IP neighbor resolver for the particular VNI specified by the ARP request (operation 614) and replicates the ARP request to centralized cluster 606 (operation 616). Note that, if there are multiple IP neighbor resolvers, edge switch 604 can select one to replicate the ARP request or replicate the ARP request to all IP neighbor resolvers.

The active router(s) in centralized cluster 606 learns or updates its ARP cache (e.g., the ARP table) based on the source IP and MAC addresses included in the ARP request (operation 618). For example, it can add an ARP entry corresponding to host 600 based on the received ARP request.

Subsequently, centralized cluster 606 checks its ARP cache to determine if a corresponding ARP entry (i.e., an ARP entry corresponding to host H4) exists in the cache (operation 620). If so, centralized cluster 606 sends a proxy ARP reply to host 600 on behalf of target host 602 with the MAC address of target host 602 (operation 622), and host 600 subsequently updates its own ARP cache based on the reply (operation 624). As one can see, operations 612-624 are similar to operations 512-524 shown in FIG. 5.

If centralized cluster 606 cannot find a matching entry in its ARP cache, centralized cluster 606 can replicate the ARP broadcast request to all edge switches in the network, except for the edge switch originating the ARP broadcast (operation 626). Note that, if the target host is local to the edge switch originating the ARP broadcast, then the ARP reply would have been sent locally. Hence, there is no need to replicate the ARP request to the originating edge switch. However, in FIG. 5, the centralized router is attempting to learn the address of the target host, and replicating the ARP request to the originating edge switch allows a target host local to the originating edge switch to send a reply. In the example shown in FIG. 6, centralized cluster 606 sends the ARP request to edge switch 608 (which corresponds to edge switch 214 in FIG. 2) hosting the particular VLAN (e.g., VLAN 10) specified by the ARP request, without sending the ARP request to source edge switch 604.

Edge switch 608 sends the ARP broadcast request to target host 602, which is attached to edge switch 608 (operation 628). In response, target host 602 sends an ARP reply with its MAC address to requesting host 600 (operation 630). Host 600 subsequently updates its own ARP cache by adding an entry for target host 602 based on information included in the reply (operation 632).

In the example shown in FIG. 6, when centralized cluster 606 does not have the corresponding ARP entry in its own ARP cache, it merely replicates the ARP broadcast request to edge devices other than the originating device. This way, there is no additional delay in resolving the ARP request. However, centralized cluster 606 will not be able to learn the MAC address for the target host. Such information will be acquired later (e.g., when the target host sends out an ARP request). Once centralized cluster 606 learns the MAC address of the target host, subsequent ARP broadcasts for the target host can be suppressed. Comparatively, the solution shown in FIG. 5 can provide better ARP/ND suppression, and hence less broadcast/multicast in the network. It is estimated that the broadcast/multicast traffic can be reduced by up to 99% when this solution is implemented. A significant reduction in broadcast/multicast packets can also be achieved when the solution shown in FIG. 6 is implemented.

In the examples shown in FIGS. 5-6, the address resolution requests sent by hosts are ARP requests. In practice, the solutions shown in FIGS. 5-6 can be applied to situations where the hosts send ND requests used in IPV6.

Figure 7:
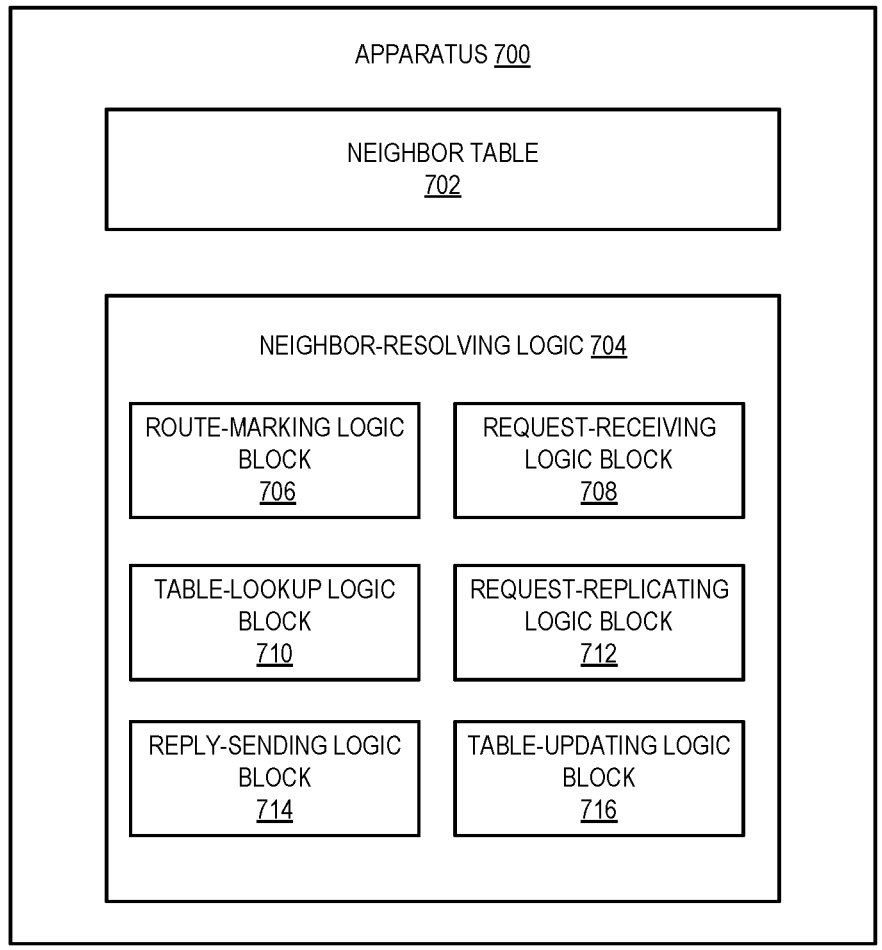
FIG. 7 illustrates an exemplary apparatus for replication and suppression of address resolution requests in a centralized network, according to one aspect of this application.

FIG. 7 illustrates an exemplary apparatus for replication and suppression of address resolution requests in a centralized network, according to one aspect of this application. Apparatus 700 can comprise a plurality of units or apparatuses, which may communicate with one another via a wired, wireless, quantum light, or electrical communication channel. Apparatus 700 may be realized using one or more integrated circuits (e.g., ASICs), and may include fewer or more units or apparatuses than those shown in FIG. 7. Furthermore, apparatus 700 may be integrated in a computer system, or realized as a separate device or devices capable of communicating with other computer systems and/or devices. In some aspects of this application, apparatus 700 can be part of a switching element (e.g., a switch or a router) in a network. Note that the switching element may include additional units or devices, such as transmitting and receiving ports, switching logics, on-switch memory, etc., which are not shown in FIG. 7. In one aspect of this application, apparatus 700 can be part of an L3 router deployed in a centralized network implementing EVPN.

Apparatus 700 includes a neighbor table 702 and a neighbor-resolving logic 704. Neighbor table 702 can store information obtained from address resolutions, such as MAC-IP binding. Neighbor-resolving logic 704 can facilitate neighbor resolution on behalf of an edge device in the centralized network. Neighbor table 702 and neighbor-resolving logic 704 can be implemented using hardware as well as software.

Neighbor-resolving logic 704 can include a route-marking logic block 706, a request-receiving logic block 708, a table-lookup logic block 710, a request-replicating logic block 712, a reply-sending logic block 714, and a table-updating logic block 716.

Route-marking logic block 706 can mark an RT-3 route as a route to a neighbor resolver. In one aspect of this application, route-marking logic block 706 can send out a predetermined BGP EC attribute (e.g., the Non-Transitive Opaque EC attribute shown in FIG. 3) while advertising the RT-3 route.

Request-receiving logic block 708 can receive an address resolution request from edge devices in the network, and table-lookup logic block 710 can look up neighbor table 702 to determine if a matching entry can be found based on the received address resolution request.

Reply-sending logic block 714 can send out a proxy reply if a matching entry is found, thus suppressing replication of the address resolution request. Otherwise, request-replicating logic block 712 can replicate the address resolution request to other edge devices (e.g., edge switches) in the network. Request-replicating logic block 712 can be configured to operate in two different modes. In a proxy mode, request-replicating logic block 712 can modify the address resolution request by replacing the source address using its own IP address and replicate the modified address resolution request to all edge devices on the particular VLAN (determined based on the request). In a replicator mode, request-replicating logic block 712 can simply replicate the original address resolution request to edge devices on the particular VLAN other than the source device sending the address resolution request. The mode of operation of request-replicating logic block 712 can be configurable (e.g., by a system administrator).

Note that, when request-replicating logic block 712 operates in the proxy mode, reply-sending logic block 714 can be configured to send a proxy reply to the address resolution request upon receiving a reply from a target host.

Table-updating logic block 716 can update neighbor table 702 based on learnt address information. For example, table-updating logic block 716 can use information included in the address resolution request to update neighbor table 702. In addition, when request-replicating logic block 712 operates in the proxy mode, table-updating logic block 716 can use information included in the reply to the modified address resolution request to update neighbor table 702.

Figure 8:
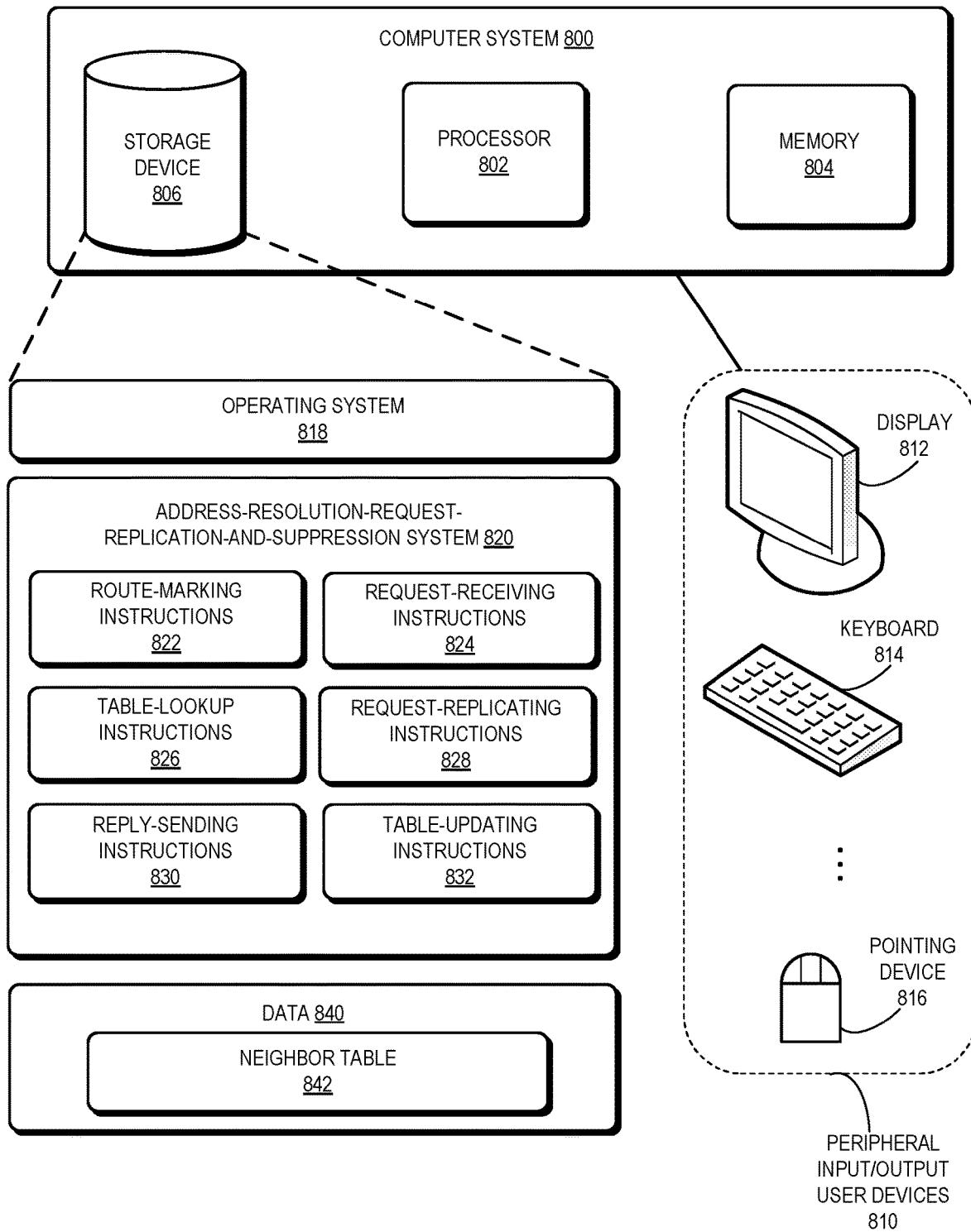
FIG. 8 illustrates an exemplary computer system that facilitates replication and suppression of address resolution requests in a centralized network, according to one aspect of this application.

FIG. 8 illustrates an exemplary computer system that facilitates replication and suppression of address resolution requests in a centralized network, according to one aspect of this application. Computer system 800 includes a processor 802, a memory 804, and a storage device 806. Furthermore, computer system 800 can be coupled to peripheral input/output (I/O) user devices 810, e.g., a display device 812, a keyboard 814, and a pointing device 816. Storage device 806 can store an operating system 818, an address resolution-request-replication-and-suppression system 820, and data 840.

Address resolution-request-replication-and-suppression system 820 can include instructions, which when executed by computer system 800, can cause computer system 800 or processor 802 to perform methods and/or processes described in this disclosure. Specifically, address resolution-request-replication-and-suppression system 820 can include instructions for marking a route to a neighbor resolver (route-marking instructions 822), instructions for receiving address resolution requests (request-receiving instructions 824), instructions for looking up the neighbor table based on the received address resolution requests (table-lookup instructions 826), instructions for replicating address resolution requests in response to no matching entry existing in the neighbor table (request-replicating instructions 828), instructions for sending proxy replies to the address resolution requests (reply-sending instructions 830), and instructions for updating the neighbor table (table-updating instructions 832). Data 840 can include a neighbor table 642 that stores IP-MAC mappings.

In general, the disclosed aspects provide a solution to the problem of the flooding of address resolution (ARP or ND) requests in a centralized network, where L2 edge devices lack the ARP/ND suppression capabilities. More specifically, the solution allows the centralized gateways (which are often L3 routers) to function as the neighbor resolvers for L2 edge devices by announcing their roles to the L2 edge device via a BGP EC attribute sent over RT-3 routes. When an L2 edge device receives an address resolution request (e.g., an ARP request) from an attached host, instead of broadcasting the request to the specific VLAN, the L2 edge device only sends the address resolution request to one of its neighbor resolvers. If the resolver can resolve the request using its cached entries, it sends back a proxy reply and suppresses replication of the address resolution request. Otherwise, the resolver can facilitate the address resolution by replicating the request to other edge devices on the VLAN. The resolver can either work in a proxy mode (which involves replicating the request to all edge devices using its own IP address as the source address) or work in a replicator mode (which involves replicating the original request to edge devices other than the source device). When working in the proxy mode, the resolver learns the address of a target host from a reply sent by the target host and sends a proxy reply on behalf of the target host. This allows the resolver to suppress further requests for the target host. When working in the replicator mode, the resolver will not learn the address of the target host, which directly sends a reply to the requesting host.

The proposed solution does not require significant changes to EVPN routing behaviors and can work in all high-availability scenarios where EVPN works, including having a single cluster with multiple routers, having multiple clusters, or having multiple independent routers. In addition, the routers in a cluster can be either in the active-active mode (e.g., both routers are active) or active-standby mode (e.g., one is active while the other one stands by).

The proposed solution does not add significantly more loads to the centralized routers. Replication of the requests is performed by hardware, which in turn takes care of the replication load aspect, whereas one needs to consider the suppression logic tradeoff, because all broadcast and multicast traffic is processed by the router CPU. However, the existence of multiple clusters/routers ensures load sharing of the suppression load. Moreover, the existence of multiple clusters/routers also ensures that the proposed solution does not affect the scaling of the network. In fact, due to the reduced amount of broadcast/multicast traffic, the scale of network traffic can be improved.

The proposed solution provides the possibility of ARP and IPV6 neighbor solicitation suppression in a centralized network, which conventionally lacks such capability. It can significantly reduce the amount of address resolution broadcast/multicast packets (e.g., by up to 99%), thus freeing up more bandwidth for data traffic. In addition, this solution provides better and balanced utilization of centralized gateway routers.

One aspect of this application provides a method and system for managing address resolution requests in a network. During operation, a gateway of the network advertises a route for sending address resolution requests and determines whether a cached entry corresponding to an address resolution request received via the route exists in a neighbor table. In response to determining that the cached entry exists, the gateway responds to the address resolution request based on the cached entry; in response to determining that the cached entry does not exist, the gateway replicates the address resolution request for sending to edge devices in the network, thereby facilitating discovery of a target host corresponding to the address resolution request.

In a variation on this aspect, the network implements Ethernet Virtual Private Network (EVPN)-based routing, and advertising the route comprises sending a predetermined border gateway protocol (BGP) Extended Communities (EC) attribute along an EVPN Type-3 route.

In a variation on this aspect, an edge device configures a broadcast domain for broadcasting address resolution requests, and configuring the broadcast domain comprises adding a tunnel to the gateway based on the advertised route.

In a further aspect, configuring the broadcast domain further comprises: in response to determining, by the edge device, that the gateway fails, removing the tunnel from the broadcast domain and adding a second tunnel to a second gateway; and in response to determining that all gateways fail, adding tunnels to all other edge devices in a network specified by the address resolution request, thereby facilitating broadcast of the address resolution request in the network.

In a variation on this aspect, replicating the address resolution request comprises: modifying the received address resolution request by replacing a source address included in the received address resolution request with an address of the gateway; identifying edge devices in a network specified by the received address resolution request; and sending the modified address resolution request to all of the identified edge devices.

In a further aspect, the gateway receives, from the target host, a reply to the modified address resolution request; updates the neighbor table based on the reply; and sending a proxy reply to a source host originating the address resolution request.

In a variation on this aspect, replicating the address resolution request comprises identifying edge devices in a network specified by the received address resolution request and replicating the address resolution request to all of the identified edge devices except an edge device from which the address resolution request is received, thereby allowing the address resolution request to reach the target host.

In a variation on this aspect, the network is a centralized campus network or a centralized data center network.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, they perform the methods and processes included within them.

The foregoing descriptions of aspects have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A computer-executed method for managing address resolution requests in a network, comprising:
   advertising, by a gateway of the network, a route for sending address resolution requests;
   determining, by the gateway, whether a cached entry corresponding to an address resolution request received via the route exists in a neighbor table;
   in response to determining that the cached entry exists, responding to the address resolution request based on the cached entry; and
   in response to determining that the cached entry does not exist, replicating the address resolution request for sending to edge devices in the network, thereby facilitating discovery of a target host corresponding to the address resolution request.

2. The method of claim 1, wherein the network implements Ethernet Virtual Private Network (EVPN)-based routing, and wherein advertising the route comprises sending a predetermined Border Gateway Protocol (BGP) Extended Communities (EC) attribute along an EVPN Type-3 route.

3. The method of claim 1, further comprising:
   configuring, by an edge device, a broadcast domain for broadcasting address resolution requests, wherein configuring the broadcast domain comprises adding a tunnel to the gateway based on the advertised route.

4. The method of claim 3, wherein configuring the broadcast domain further comprises:
   in response to determining, by the edge device, that the gateway fails, removing the tunnel from the broadcast domain and adding a second tunnel to a second gateway; and
   in response to determining that all gateways fail, adding tunnels to all other edge devices in a network specified by the address resolution request, thereby facilitating broadcast of the address resolution request in the network.

5. The method of claim 1, wherein replicating the address resolution request comprises:
   modifying the received address resolution request by replacing a source address included in the received address resolution request with an address of the gateway;
   identifying edge devices in a network specified by the received address resolution request; and
   sending the modified address resolution request to all of the identified edge devices.

6. The method of claim 5, further comprising:
   receiving, by the gateway, from the target host a reply to the modified address resolution request;
   updating the neighbor table based on the reply; and
   sending a proxy reply to a source host originating the address resolution request.

7. The method of claim 1, wherein replicating the address resolution request comprises:
   identifying edge devices in a network specified by the received address resolution request; and
   replicating the address resolution request to all of the identified edge devices except an edge device from which the address resolution request is received, thereby allowing the address resolution request to reach the target host.

8. The method of claim 1, wherein the network is a centralized campus network or a centralized data center network.

9. A computer system, comprising:
   a processor;
   a storage device coupled to the processor and storing instructions, which when executed by the processor cause the processor to perform a method for managing address resolution requests in a network, the method comprising:
      advertising, by a gateway of the network, a route for sending address resolution requests;
      determining, by the gateway, whether a cached entry corresponding to an address resolution request received via the route exists in a neighbor table;
      in response to determining that the cached entry exists, responding to the address resolution request based on the cached entry; and
      in response to determining that the cached entry does not exist, replicating the address resolution request for sending to edge devices in the network, thereby facilitating discovery of a target host corresponding to the address resolution request.

10. The computer system of claim 9, wherein the network implements Ethernet Virtual Private Network (EVPN)-based routing, and wherein advertising the route comprises sending a predetermined Border Gateway Protocol (BGP) Extended Communities (EC) attribute along an EVPN Type-3 route.

11. The computer system of claim 9, further comprising:
    configuring, by an edge device, a broadcast domain for broadcasting address resolution requests, wherein configuring the broadcast domain comprises adding a tunnel to the gateway based on the advertised route.

12. The computer system of claim 11, wherein configuring the broadcast domain further comprises:
    in response to determining, by the edge device, that the gateway fails, removing the tunnel from the broadcast domain and adding a second tunnel to a second gateway; and
    in response to determining that all gateways fail, adding tunnels to all other edge devices in a network specified by the address resolution request, thereby facilitating broadcast of the address resolution request in the network.

13. The computer system of claim 9, wherein replicating the address resolution request comprises:
    modifying the received address resolution request by replacing a source address included in the received address resolution request with an address of the gateway;
    identifying edge devices in a network specified by the received address resolution request; and
    sending the modified address resolution request to all of the identified edge devices.

14. The computer system of claim 13, further comprising:
    receiving, by the gateway, from the target host a reply to the modified address resolution request;

updating the neighbor table based on the reply; and sending a proxy reply to a source host originating the address resolution request.

15. The computer system of claim 9, wherein replicating the address resolution request comprises:

identifying edge devices in a network specified by the received address resolution request; and replicating the address resolution request to all of the identified edge devices except an edge device from which the address resolution request is received, thereby allowing the address resolution request to reach the target host.

16. A non-transitory computer-readable storage medium storing instructions that when executed by a computer cause the computer to perform a method for managing address resolution requests in a network, the method comprising:

advertising, by a gateway of the network, a route for sending address resolution requests;

determining, by the gateway, whether a cached entry corresponding to an address resolution request received via the route exists in a neighbor table;

in response to determining that the cached entry exists, responding to the address resolution request based on the cached entry; and in response to determining that the cached entry does not exist, replicating the address resolution request for sending to edge devices in the network, thereby facilitating discovery of a target host corresponding to the address resolution request.

17. The non-transitory computer-readable storage medium of claim 16, wherein the network implements Ethernet Virtual Private Network (EVPN)-based routing, and wherein advertising the route comprises sending a predetermined Border Gateway Protocol (BGP) Extended Communities (EC) attribute along an EVPN Type-3 route.

18. The non-transitory computer-readable storage medium of claim 16, wherein replicating the address resolution request comprises:

modifying the received address resolution request by replacing a source address included in the received address resolution request with an address of the gateway;

identifying edge devices in a network specified by the received address resolution request; and sending the modified address resolution request to all of the identified edge devices.

19. The non-transitory computer-readable storage medium of claim 18, further comprising:

receiving, by the gateway, from the target host a reply to the modified address resolution request;

updating the neighbor table based on the reply; and sending a proxy reply to a source host originating the address resolution request.

20. The non-transitory computer-readable storage medium of claim 16, wherein replicating the address resolution request comprises:

identifying edge devices in a network specified by the received address resolution request; and replicating the address resolution request to all of the identified edge devices except an edge device from which the address resolution request is received, thereby allowing the address resolution request to reach the target host.

* * * * *